US010965901B2

(12) United States Patent
Higuchi et al.

(10) Patent No.: US 10,965,901 B2
(45) Date of Patent: *Mar. 30, 2021

(54) IMAGING DEVICE AND RECORDING CONTROL SYSTEM

(71) Applicant: Sony Corporation, Tokyo (JP)

(72) Inventors: Yoshinari Higuchi, Tokyo (JP); Riuzou Nagatsuka, Tokyo (JP); Tomohito Kizaki, Tokyo (JP); Hirotsugu Okubo, Tokyo (JP)

(73) Assignee: Sony Corporation

( * ) Notice: Subject to any disclaimer, the term of this patent is extended or adjusted under 35 U.S.C. 154(b) by 282 days.

This patent is subject to a terminal disclaimer.

(21) Appl. No.: 15/364,744

(22) Filed: Nov. 30, 2016

(65) Prior Publication Data

US 2017/0085830 A1 Mar. 23, 2017

Related U.S. Application Data

(63) Continuation of application No. 14/872,735, filed on Oct. 1, 2015, now Pat. No. 9,549,146, which is a (Continued)

(30) Foreign Application Priority Data

Apr. 4, 2003 (JP) .............................. JP2003-102163

(51) Int. Cl.
*H04N 5/77* (2006.01)
*G11B 27/00* (2006.01)
(Continued)

(52) U.S. Cl.
CPC ............. *H04N 5/77* (2013.01); *G11B 27/002* (2013.01); *G11B 27/034* (2013.01); *G11B 27/34* (2013.01);
(Continued)

(58) Field of Classification Search
USPC .................................. 386/223–229
See application file for complete search history.

(56) References Cited

U.S. PATENT DOCUMENTS 5,930,446 A 7/1999 Kanda
5,953,481 A * 9/1999 Watanabe ............ G11B 27/028
348/239
(Continued)

FOREIGN PATENT DOCUMENTS

JP 10200844 A 7/1998
JP 2000278550 A 10/2000
(Continued)

OTHER PUBLICATIONS

Gowan, Michael PCWorld.com—How It Works: IEEE 1394 (1999).
(Continued)

*Primary Examiner* — Nigar Chowdhury
(74) *Attorney, Agent, or Firm* — Lerner, David, Littenberg, Krumholz & Mentlik, LLP

(57) ABSTRACT

An object of the present invention is to realize an imaging device and recording control system in which the usability thereof can be improved dramatically. In an imaging device configured to output imaging data that is obtained as a result of imaging of an object, and a recording control system, the imaging device comprises a control means for recognizing a controlled state of an external recording device when a communication is enabled with the recording device through a communication means conforming to a predetermined transmission method and an input means for allowing the recording device to execute an application needed for a recording operation obtained by controlling the recording device, and the recording device records the imaging data obtained through the communication means when the application is executed by means of the input means.

20 Claims, 11 Drawing Sheets

Related U.S. Application Data continuation of application No. 10/816,710, filed on Apr. 2, 2004, now Pat. No. 9,183,880.

(51) Int. Cl.

| | | |
|---|---|---|
| G11B 27/034 | (2006.01) | |
| G11B 27/34 | (2006.01) | |
| G11B 27/36 | (2006.01) | |
| G11B 31/00 | (2006.01) | |
| H04N 5/765 | (2006.01) | |
| H04N 5/85 | (2006.01) | |
| H04N 5/372 | (2011.01) | |
| H04N 5/378 | (2011.01) | |

(52) U.S. Cl.
CPC .............. *G11B 27/36* (2013.01); *G11B 31/00* (2013.01); *H04N 5/765* (2013.01); *G11B 2220/216* (2013.01); *G11B 2220/218* (2013.01); *G11B 2220/2562* (2013.01); *G11B 2220/2575* (2013.01); *H04N 5/372* (2013.01); *H04N 5/378* (2013.01); *H04N 5/772* (2013.01); *H04N 5/85* (2013.01)

(56) References Cited

U.S. PATENT DOCUMENTS

| 6,496,862 | B1 | 12/2002 | Akatsu et al. |
| 6,757,906 | B1 * | 6/2004 | Look ............... H04N 21/47217 725/45 |
| 7,043,644 | B2 | 5/2006 | DeBruine |
| 7,072,576 | B2 | 7/2006 | Tanaka |
| 7,106,364 | B1 | 9/2006 | Noro et al. |
| 7,123,813 | B2 | 10/2006 | Inoue |
| 2001/0022662 | A1 * | 9/2001 | Hosoda ............. H04N 1/00633 358/1.9 |
| 2002/0063781 | A1 | 5/2002 | Aizawa |
| 2002/0102095 | A1 | 8/2002 | Koyama |
| 2002/0147931 | A1 * | 10/2002 | Liu ....................... G06F 1/3203 713/300 |
| 2002/0167682 | A1 | 11/2002 | Dong et al. |
| 2003/0180032 | A1 * | 9/2003 | Barde ................... G11B 27/11 386/244 |

FOREIGN PATENT DOCUMENTS

| JP | 2002-133406 | 5/2002 |
| JP | 2002204414 A | 7/2002 |

OTHER PUBLICATIONS

The HAVi Specification Specification of the Home Audio/Video Interoperability (HAVi) Architecture (1998) XP002118795.

European Examination Report for Application No. 04251983.5 dated Apr. 25, 2016.

Extended European Search Report for Application No. EP17173802.4 dated Sep. 14, 2017.

Summons to Attend Oral Proceedings Pursuant to Rule 115(1) EPC for Application No. 04251983.5 dated Jan. 31, 2019.

\* cited by examiner

IMAGING DEVICE AND RECORDING CONTROL SYSTEM

CROSS-REFERENCE TO RELATED APPLICATIONS

The present application is a continuation of U.S. application Ser. No. 14/872,735, filed on Oct. 1, 2015, which is a continuation of U.S. application Ser. No. 10/816,710 filed on Apr. 2, 2004, which is now U.S. Pat. No. 9,183,880 issued on Nov. 10, 2015, which claims the benefit of Japanese Application No. 2003-102163 filed on Apr. 4, 2003 in the Japanese Patent Office, the disclosures of which are incorporated herein by reference.

BACKGROUND OF THE INVENTION

Field of the Invention

The present invention relates to an imaging device and recording control system, and can be suitably applied to, for example, a video camera system in which a video camera is connected to a personal computer.

Description of the Related Art

Recently, home video cameras and digital versatile disc (DVD) players are in widespread use, and at the same time, personal computers have become increasingly sophisticated. Under the circumstances, the number of users who transfers images obtained by means of a video camera and output-images of a DVD player to a personal computer to store these images on recording media such as an incorporated hard disk drive or an externally inserted rewritable DVD has increased.

FIG. 1 shows a video camera system 1 in which a video camera 2 and personal computer 3 are connected with each other through a communication cable 4 conforming, for example, to the Institute of Electrical and Electronics Engineers (IEEE) 1394 standard. Transferring an image of an object obtained by means of the video camera 2 to the personal computer 3 will be explained below.

The personal computer 3 starts an image copying routine RT1 shown in FIG. 2 from step SP0 with the video camera 2 connected thereto. Subsequently, in step SP1, the personal computer 3 waits for a start-up request, for a data copy operation (hereinafter referred to as DVD creation) from the video camera 2 onto a rewritable DVD, to be issued by a user's operation.

If YES in step SP1, the flow advances to step SP2 and the personal computer 3 runs an application for DVD creation. Thereafter, in step SP3, the personal computer 3 transmits a predetermined control command to the video camera 2 through the communication cable 4 to allow the video camera 2 to transmit an imaging result to the personal computer 3 through the communication cable 4.

Subsequently, in step SP4, the personal computer 3 controls an image recording section incorporated therein to record the imaging result transferred from the video camera 2 on the inserted DVD.

The personal computer 3 determines whether a termination of DVD creation is requested by user's operation in step SP5. If YES in step SP5, the flow advances to step SP6, and the personal computer 3 exits the application for DVD creation, and the image copying routine RT1 ends in step SP7.

On the other hand, if NO in step SP5, the personal computer 3 determines whether the data copy operation for the DVD has already been completed or not in step SP8.

When the personal computer 3 determines, in step SP8, that the DVD creation has been completed, the flow advances to step S7 and the image copying routine RT1 ends. On the other hand, when the personal computer 3 determines that the DVD creation has not been completed, the flow returns to step SP3, and the same processes as above are repeated.

As described above, in the conventional video camera system 1, the user operates the personal computer 3 with the video camera 2 connected to the personal computer 3, thereby attaining the data copy operation from the video camera 2 to the personal computer 3 (refer to, for example, Japanese Patent Laid Open No. 2000-32321 (Pages 21 to 22, FIGS. 30 to 33))

However, the video camera system 1 has a disadvantage that the copy operation of the imaging result of the video camera 2 to the DVD inserted into the personal computer 3 cannot be carried out unless the personal computer 3 is operated by the user.

In practice, a user firstly operates the personal computer 3 to run a predetermined application for DVD creation, and then, the user must set a starting point of capturing the imaging data or a bit rate at the time of DVD creation according to instructions from the application in some cases, and must give instructions related to a series of operations from the start of DVD creation to the end of the application using the personal computer 3. Therefore, it is difficult for the user who cannot fully handle the personal computer 3 to carry out the operation.

Further, after the personal computer 3 has been started up, control of the video camera 2 is conducted at the initiative of the personal computer 3. Accordingly, it is impossible to operate the application provided with the personal computer 3 and confirm the progress of the application respectively from the video camera 2. It follows that when the user visually confirms the progress of the data copy operation with attention only to the video camera 2, it is impossible to know which operation is in progress, for example, whether the imaging data is being captured or the imaging data is being recorded on the DVD. In this case, erroneous operations may occur. For example, the user may unplug the communication cable 4 conforming to IEEE 1394 standard to cancel the DVD creation, manipulate an operation panel on the video camera 2 when the capturing is in progress to stop tape running, or eject the videotape at capturing time.

SUMMARY OF THE INVENTION

In view of the foregoing, an object of this invention is to provide an imaging device and recording control system in which the user's usability can be improved dramatically.

To solve the above problems, an imaging device according to the present invention configured to output imaging data that is obtained by imaging of an object comprises a control means for recognizing a controlled state of an external recording device when a communication is enabled with the recording device through a communication means conforming to a predetermined transmission method and an input means for allowing the recording device to execute an application needed for a recording operation obtained by controlling the recording device, and the recording device is configured to record the imaging data obtained through the communication means when the application executed by means of the input means.

As a result, a user can run the application provided with the recording device and needed for a recording operation by using only the input means of the imaging device, thereby copying the imaging data obtained as the imaging result of the imaging device to the recording device.

Further, in a recording control system according to the present invention in which an imaging device configured to output imaging data that is obtained by imaging of an object can communicate with a recording device through a communication means conforming to a predetermined transmission method, the imaging device comprises a first control means for recognizing a controlled state of the recording device and an input means for allowing the recording device to execute an application needed for a recording operation obtained by controlling the recording device, and the recording device comprises a second control means for recognizing a controlled state of the imaging device and a recording means for recording the imaging data obtained from the imaging device through the communication means based on the application executed by means of the input means under control of the recording device.

As a result, in the recording control system, the user can run the application provided with the recording device and needed for a recording operation by using only the input means of the imaging device, thereby copying the imaging data obtained as the imaging result of the imaging device to the recording device.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Entire Configuration of Video Camera System According to Present Embodiment

Figure 3:
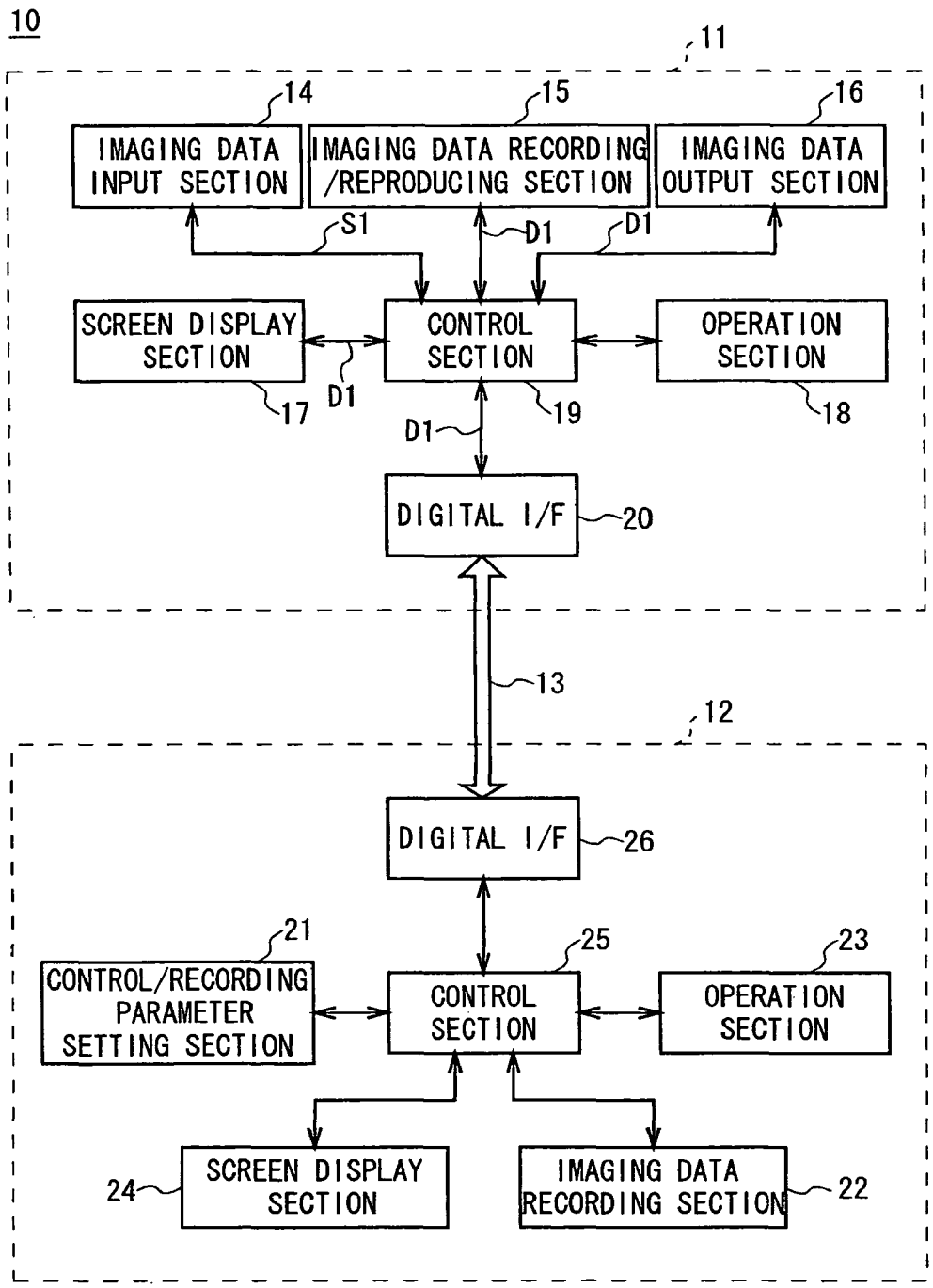
FIG. 3 is a block diagram showing a configuration of the video camera system according to an embodiment.

In FIG. 3, reference numeral 10 denotes a video camera system according to the present embodiment. In the video system 10, a video camera 11 and personal computer 12 are connected to each other through a communication cable 13 conforming to, for example, IEEE 1394 standard.

The video camera 11 is configured to perform various operations under control of a control section 19, to which an imaging data input section 14, imaging data recording/reproducing section 15, imaging data output section 16, screen display section 17 and operation section 18 are connected.

At the time of shooting an object, the imaging data input section 14 photoelectrically converts an imaging light incident through a projection lens on an imaging surface of a charge coupled device (CCD) to obtain an image signal, and then subjects the image signal to correlated double sampling and auto gain control (AGC) processing to decrease noise components and prevent contrast from fluctuating, followed by digital conversion.

The imaging data input section 14 then subjects the digitized image signal to Y/C separation, white balance adjustment, and y (gamma)-correction, converts the resultant signal to a video signal S1 by matrix processing, and transmits it to the control section 19.

When the shooting is in progress, the control section 19 sequentially writes the video signal S1 into a random access memory (RAM) (not shown) in units of frame. At the same time, the control section 19 converts the video signal S1 to an imaging data D1 composed of composite signals conforming to a predetermined method such as the National Television System Committee (NTSC) by an encoder (not shown), and transmits the imaging data D1 to the imaging data recording/reproducing section 15, imaging dada output section 16, and screen display section 17.

When instructed to, for example, perform a zoom processing based on the user's operation on the operation section 18, the control section 19 enlarges/reduces the video signal S1 at a specified scale factor in frame. Thereafter the control section 19 sequentially writes the resultant enlarged or reduced image into the RAM and allows the screen display section 17 to display in real time moving images based on the imaging data D1 (hereinafter referred to as finder image) through the encoder.

The imaging data recording/reproducing section 15 includes a tape inserting portion (not shown) into which the videotape can be inserted. Upon receiving a transmission signal generated in response to the user's insertion/ejection of the videotape, the imaging data recording/reproducing section 15 transmits the signal to the control section 19, and records the finder images generated based on the imaging data D1 transmitted from the control section 19 to the videotape.

The imaging data output section 16 includes a speaker, analog ports and the like and is configured to output, as desired, a sound, video picture or the like generated based on the imaging data D1 transmitted from the control section 19. The operation section 18 includes various kinds of keys, switches and the like provided in the video camera 11. When a remote commander (not shown) is included, the operation section 18 also includes a receiving section of the remote commander.

The video camera 11 also includes a digital interface (I/F) 20 in order for the control section 19 to communicate with the personal computer 12 through the communication cable 13, thereby sending/receiving various types of data and commands to/from the personal computer 12.

Further, in the present embodiment, the control section 19 is configured to receive a controlled state (hereinafter referred to as "status") of the personal computer 12 at regular time intervals, and to transmit a start-up or termination request for the DVD creation application caused by the user's operation on the video camera 11, or the status displayed on the video camera 11.

The personal computer 12 is configured to perform various operations under control of a control section 25, to which a control/recording parameter setting section 21, imaging data recording section 22, operation section 23, and screen display section 24 are connected.

The personal computer 12 also includes a digital interface (I/F) 26 in order for the control section 25 to communicate with the video camera 11 through the communication cable 13, thereby sending/receiving various types of data and commands to/from the video camera 11.

The control/recording parameter setting section 21 includes a read only memory (ROM) in which various kinds of software applications are stored, a RAM which acts as a working memory of the control section 25, and a hard disk drive in which the various types of data is stored, thereby configured to set mainly a control parameter of the video camera 11 or recording parameter for recording operations to the DVD.

The imaging data recording section 22 includes a disk inserting portion (not shown) into which the DVD can be inserted. The imaging data recording section 22 transmits a transmission signal generated in response to the user's insertion/ejection of the DVD, and records video pictures generated based on the imaging data D1 output from the video camera 11 on the DVD. Note that rewritable DVDs such as a DVD-RAM or DVD-RW (Rewritable), or only recordable DVDs such as a DVD-R (Recordable) are used as a DVD for data recording.

The control section 25 performs various processing based on the imaging data D1 and the command received from the video camera 11 through the communication cable 13 and digital interface, and the software applications stored in the ROM included in the control/recording parameter setting section 21.

Further, in the present embodiment, the control section 25 is configured to transmit the progress of the DVD creation application (that is, a status of the personal computer 12) to the video camera 11 at regular time intervals and to receive a status of the video camera 11.

(2) "Set It and Leave It" Feature for DVD Creation

In the video camera system 10 according to the present embodiment, it is only necessary for the user to operate the video camera 11 to carry out the data copy operation (hereinafter referred to as "Set It And Leave It" feature for DVD creation). That is, by just connecting the video camera 11 to the personal computer 12 through the communication cable 13 and operating only the video camera 11, the imaging data D1 obtained as the imaging result of the video camera 11 can be copied to the DVD inserted into the personal computer 12.

To realize "Set It And Leave It" feature for DVD creation, controlled state monitoring programs are previously installed on the control sections 19, 25 of the video camera 11 and personal computer 12, respectively. With the programs, each of the control sections 19 and 25 carry out various processes corresponding to commands or responses exchanged with each other alternately. In addition, the DVD creation application is previously installed in the control section 25 of the personal computer 12. With this application started-up, a recording can be carried out with respect to the recordable DVD inserted into the imaging data recording section 22.

More specifically, a sequence of operations for carrying out "Set It And Leave It" feature for DVD creation is as follows. First, with the personal computer 12 and the video camera 11 connected to each other through the communication cable 13, the user inserts, into the video camera 11, the tape whose contents are to be copied and the recordable DVD into the personal computer 12. After switching the video camera 11 to the mode (hereinafter referred to as DVD creation mode) in which "Set It And Leave It" feature for DVD creation can be carried out, the user performs various operations corresponding to the DVD creation application on the side of the video camera 11.

While capturing the video picture based on the imaging data D1 from the video camera 11, the personal computer 12 subjects the captured video picture to authoring process, followed by writing the resultant data into the DVD, thereby completing the copy operation for the DVD. On this occasion, the video camera 11 asks the user if another DVD is created or not. If the user wants to end the data copy operation, he or she takes the copied DVD out of the personal computer 12.

(2-1) Routine of "Set It and Leave It" Feature for DVD Creation on Video Camera 11 Side In the video camera system 10 in which the video camera 11 is connected to the personal computer 12 through the communication cable 13, the control sections 19, 25 of the video camera 11 and the personal computer 12 respectively carry out the routines RT2 (FIG. 4) and RT3 (FIG. 5) of "Set It And Leave It" feature for DVD creation, with the routines synchronized with each other.

Figure 4:
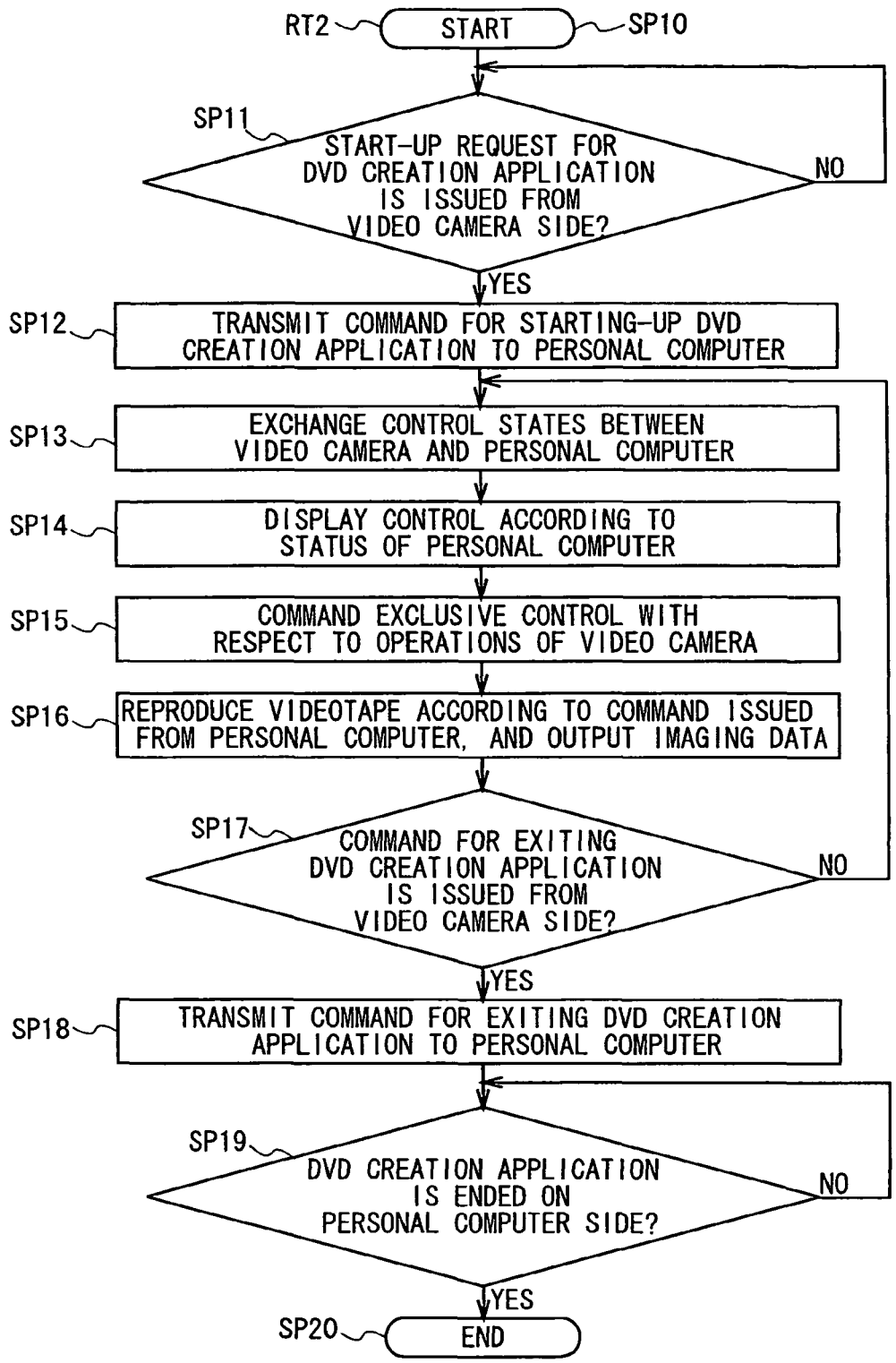
FIG. 4 is a flowchart to help explain the routine of "Set It And Leave It" feature for DVD creation on the video camera side.

As shown in FIG. 4, in a routine RT2 of "Set It And Leave It" feature for DVD creation on the side of the video camera 11, the control section 19 of the video camera 11 starts the routine from step SP10, and thereafter, in step SP11, determines whether start-up of the DVD creation application is requested through the user's input on the operation section 18.

If YES in SP11, the flow advances to step SP12 and the control section 19 transmits a command for starting-up the DVD creation application to the personal computer 12. Subsequently, in the step SP13, the video camera 11 and personal computer 12 check the controlled states of each other by exchanging between them the command and response according to the controlled state monitoring programs.

The control section 19 then recognizes the control state of the personal computer 12, that is, the status of the DVD creation application, and allows the screen display section 17 to display corresponding contents in step SP14. This enables the user to recognize the displayed contents corresponding to the status, and at the same time, prevents the user from erroneously unplugging the communication cable 13 when the DVD creation application is running.

In this state, the control section 19 disables all the commands that are issued from the operation section 18 of the video camera 11, except a command for exiting the DVD creation application, in step SP15. This means that most of the functions provided with the operation section 19 are forcibly disabled. As a result, it is possible to prevent the user from performing erroneous operations such as canceling of a playback of a videotape when the DVD application is running.

Subsequently, in step SP16, the control section 19 reproduces the imaging data D1 recorded in the videotape according to a control command issued from the personal computer 12, and simultaneously transmits the data D1 to the personal computer 12 through the communication cable 13.

The control section 19 then determines, in step SP17, whether the command for exiting the DVD creation application is issued through the user's input on the operation section 18. If YES, the flow advances to step SP18 and the control section 19 transmits the command for exiting the DVD creation application to the personal computer 12 through the communication cable 13.

Thereafter, the control section 19 determines, in step SP19, whether the DVD creation application has exited. If YES, that is, only when the corresponding response is issued from the personal computer 12, the flow advances to step SP20 and the routine RT2 of "Set It And Leave It" feature for DVD creation ends.

On the other hand, if NO in step SP17, the control section 19 determines that the input on the operation section 18 is not performed by the user. Then the flow returns to step SP13 and the same processes as those described above are repeated.

As described above, on the video camera 11 side, with a series of processes from start-up of the DVD creation application to end thereof displayed on the screen display section 17, the user operates only the operation section 18 of the video camera 11, thereby copying the imaging data D1 obtained as the imaging result from the video camera 11 to the DVD inserted into the personal computer 12.

Figure 5:
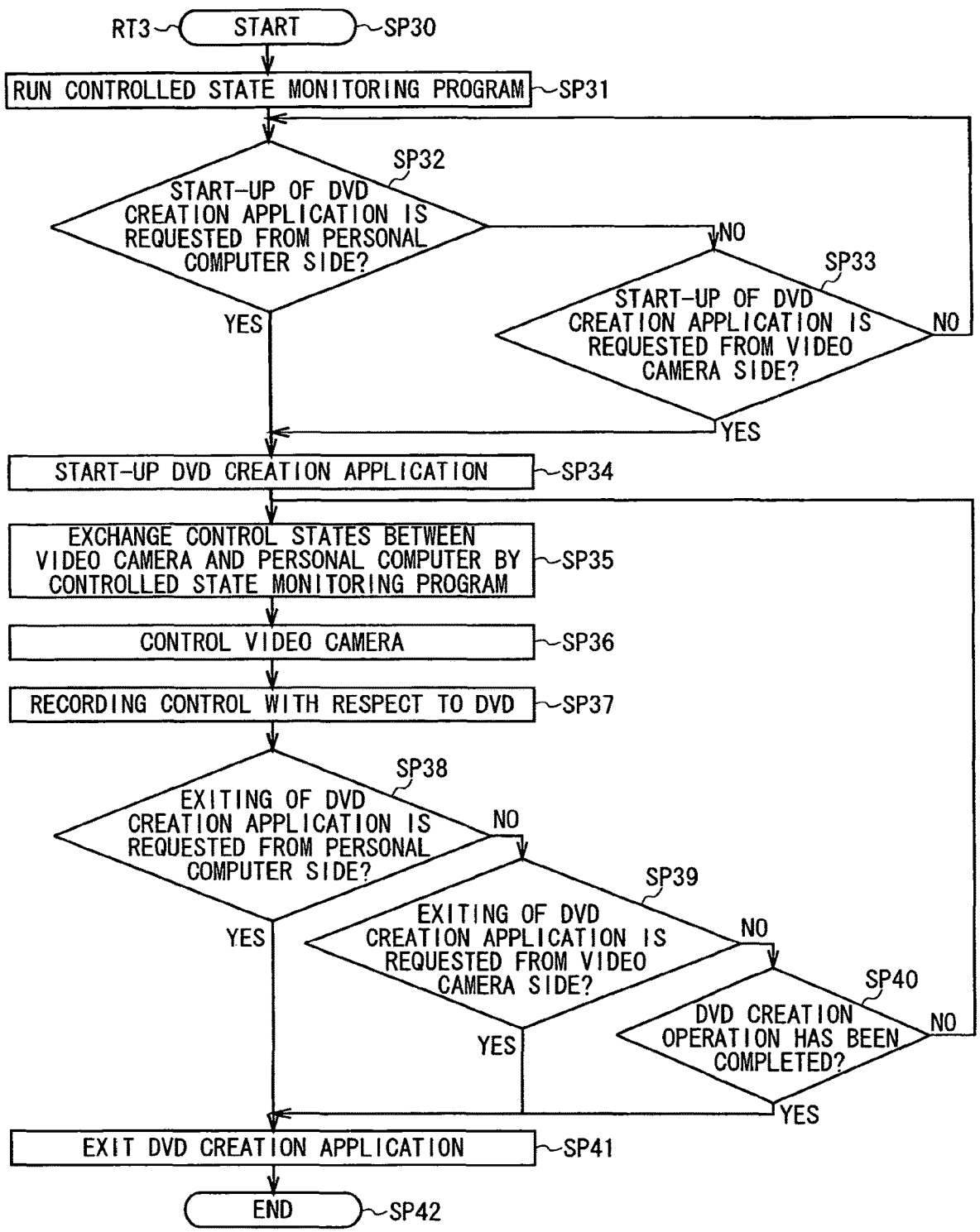
FIG. 5 is a flowchart to help explain the routine of "Set It And Leave It" feature for DVD creation on the personal computer side.

(2-2) Routine of "Set It and Leave It" Feature for DVD Creation on Personal Computer 12 Side As shown in FIG. 5, in a routine RT3 of "Set It And Leave It" feature for DVD creation on the side of the personal computer 12, the control section 25 of the personal computer 12 starts the routine from step SP30, and thereafter, in step SP31, runs the previously installed controlled state monitoring program (which is configured to stay resident in memory by default), and determines, in step SP32, whether start-up of the DVD creation application is requested through the user's input on the operation section 23.

If NO in step SP32, the flow advances to step SP33, and the control section 25 determines whether start-up of the DVD creation application is requested through the user's operation on the side of the video camera 11. If NO in this step SP33 again, the flow returns to step SP32.

As described above, in steps SP32 and SP33, the control section 25 determines whether start-up of the DVD creation application is requested through the user's operation on the video camera 11 side or personal computer 12 side. If YES in SP32 or SP33, the flow advances to step SP34.

In the step SP34, the control section 25 starts-up the DVD creation application. Thereafter the flow advances to step SP35, and the personal computer 12 and the video camera 11 check the controlled states of each other by exchanging between them the commands and responses according to the controlled state monitoring programs.

In step SP36, the control section 25 transmits a control command to the video camera 11 to allow the video camera 11 to reproduce the imaging data D1 recorded in the videotape, and to transmit the data D1 to the personal computer 12 through the communication cable 13.

The control section 25 then controls the imaging data recording section 22 to record the imaging data D1 transmitted from the video camera 11 through the communication cable 13 on the inserted DVD, in step SP37.

The flow advances to step SP38, and the control section 25 determines whether the command for exiting the DVD creation application is input through the user's operation on the operation section 23. If NO in this step SP38, the flow advances to step SP39, and the control section 25 determines whether the command for exiting the DVD creation application is input through the user's operation on the side of the video camera 11. If NO in this step SP39 again, the flow advances to step SP40 and the control section 25 determines whether the DVD creation operation, that is, recording operation for the DVD has been completed.

If NO in step SP40, the control section 25 determines that instructions to end the DVD creation are not issued from both sides of the personal computer 12 and video camera 11, and that the DVD creation has not been completed. Then the flow returns to step SP35 and the same processes as those described above are repeated.

In the steps SP38 to SP40, the control section 25 determines whether the DVD creation application has been commanded to exit by the user's operation on the personal computer 12 side or video camera 11 side, or whether the DVD creation has been completed. If YES in any of Steps SP38 to SP40, the flow advances to step SP41.

The control section 25 exits the DVD creation application in step SP41, and the routine RT3 of "Set It And Leave It" feature for DVD creation ends in step SP42.

As described above, in the personal computer 12 connected to the video camera 11, the imaging data D1 transmitted from the video camera 11 can be copied to the DVD, with a series of processes from start-up of the DVD creation application to end thereof executed responding to the user's operation from the video camera 11.

(2-3) Screen Transition State on Video Camera 11 Side

"Set It And Leave It" feature for DVD creation can be carried out with a display screen of the screen display section 17 on the video camera 11 side visually confirmed by the user. With the statuses exchanged between the video camera 11 and personal computer 12, the display screen for "Set It And Leave It" feature for DVD creation is sequentially displayed as a transition picture according to the statuses. More specifically, the display screen for "Set It And Leave It" feature for DVD creation is displayed as the following state transition diagrams ST1 shown in FIG. 7 and FIG. 8, respectively.

Figure 6A:
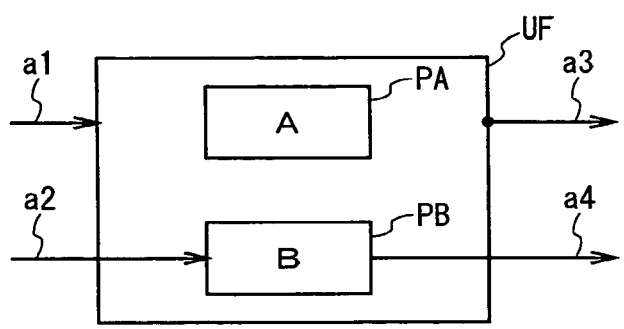
FIGS. 6A and 6B are schematic diagrams for preliminary explanation of state transition diagram.

As shown in FIG. 6A, in the state transition diagrams ST1, each of a plurality of state transition pictures such as PA and PB representing a specific status in "Set It And Leave It" feature for DVD creation is viewed in such a manner to be surrounded by a predetermined square-shaped line (hereinafter referred to as upper frame) UF.

An arrow a1 pointing the upper frame UF represents that a current transition picture switches to either the transition picture PA or transition picture PB included in the upper frame UF. An arrow a2 entering the upper frame UF and pointing a closing line of a specific transition picture PB represents that a current transition picture switches to the transition picture PB.

An arrow a3 starting from a closing line of the upper frame UF represents a transition generated from either the transition pictures PA or PB included in the upper frame UF, and an arrow a4 starting from a closing line of the specific transition picture PB, and going out of the upper frame UF represents a transition generated only from the transition picture PB.

Figure 6B:
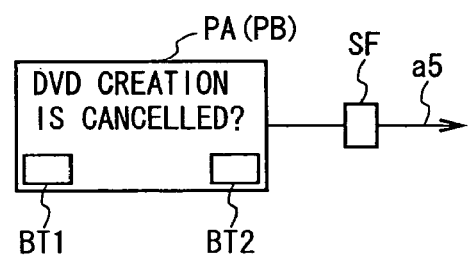

As shown in FIG. 6B, in the transition picture PA (PB), a message (for example, "DVD creation is cancelled?") displayed on the central and upper portion of the picture represents the state of the video camera 11. In addition, a button (hereinafter referred to as affirmative action button) BT1 such as DECISION, EXECUTION or OK is displayed in graphical user interface (GUI) mode on the lower left side of the picture, and a button (hereinafter referred to as negative action button) BT2 such as WITHDRAWAL or CANCEL is displayed in GUI mode on the lower right side of the picture.

A square frame SF on an arrow a5 starting from a closing line of the transition picture PA (PB) represents a trigger corresponding to each transition condition or a physical factor such as connect and disconnect, and an ellipse (not shown) on the arrow a5 represents a status change in the personal computer 12.

Fundamental conditions under which one state switches to another in the state transition diagrams ST1 shown in FIG. 7 and FIG. 8 will be described. First, the condition for the video camera 11 to enter a DVD creation mode is that a videotape must be inserted and no errors must be allowed to occur, that is, the videotape can be reproduced, and that mutual recognition with the DVD creation application of the personal computer 12 has been established through the communication cable 13.

Secondly, the condition for the video camera 11 to step out the DVD creation mode is that, in the case of involving a forced termination, the DVD creation operation has been completed normally or that DVD creation operation has been canceled, and in the case of not involving the forced termination, the communication with the personal computer 12 is disabled when the communication cable 13 is unplugged, the video camera 11 is turned off, or different kinds of factors (freeze or error in operating system (OS) or application) occur.

Thirdly, in the DVD creation mode, the video camera 11 itself does not make a judgment on whether the state transition shifts normally or not, but the state transition essentially shifts based on a status of the personal computer 12 as a priority. Fourthly, the DVD creation application is not automatically exited on the personal computer 12 side without being requested to exit by the video camera 11. This means that, for example, the user can instruct the application to create another DVD by mouse action or the like, and that the opportunity for the DVD creation operation to return to its original state when the normally operating video camera 11 is recognized again by the personal computer 12. Fifthly, in the personal computer 12, a disk (DVD) is not automatically ejected except immediately after the message "Create another DVD?" is displayed.

(2-3-1) Normal State Transition Diagram ST1

Figure 7:
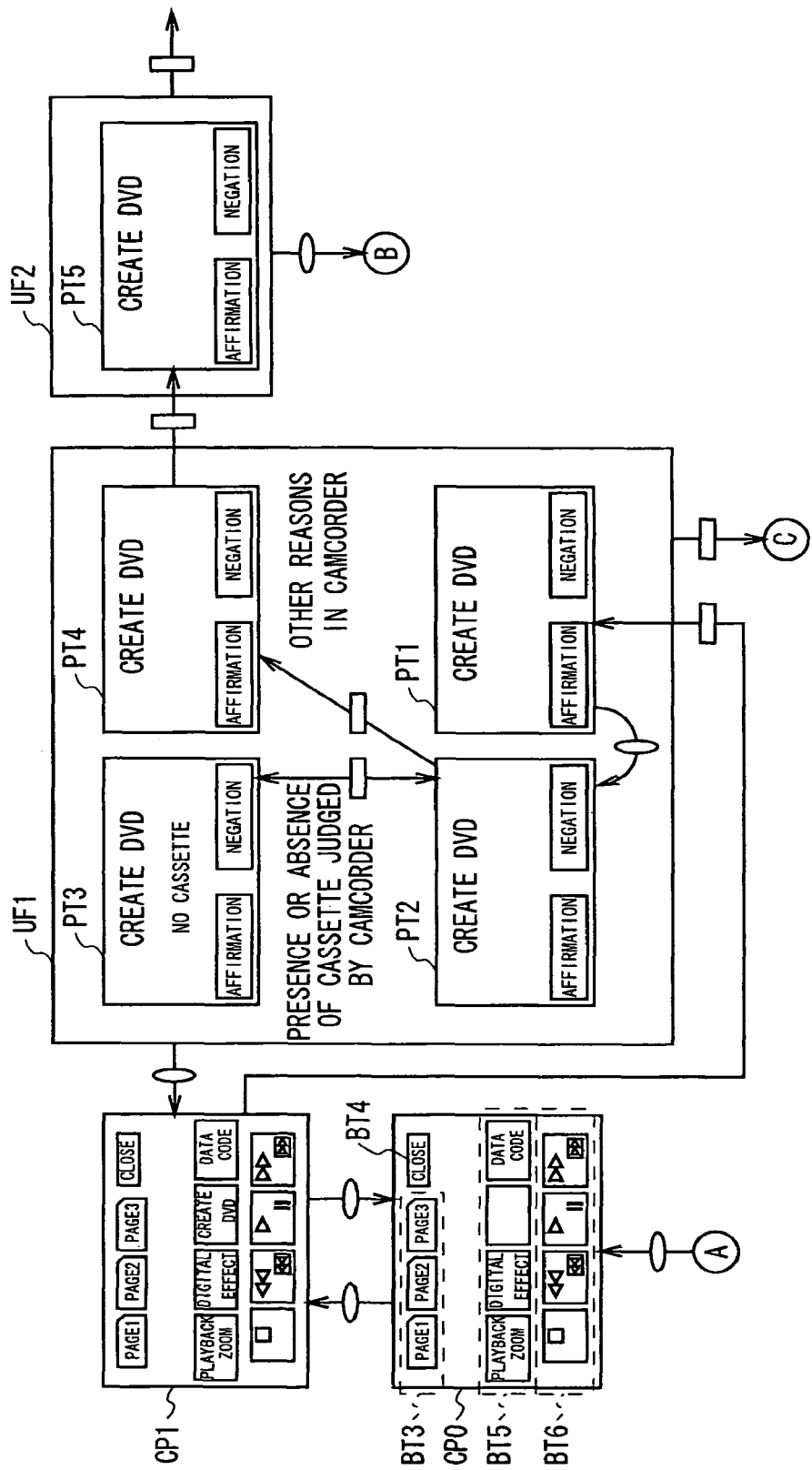
FIG. 7 is a schematic diagram to help explain the normal state transition diagram.

As shown in the state transition diagram ST1 of FIG. 7, in the display screen of the screen display section 17 of the video camera 11, a predetermined console panel CP0 is displayed with change-over buttons BT3 displayed in GUI mode on the upper section thereof and a terminate button BT4 also displayed in GUI mode next to the right end of the change buttons BT3. The change-over buttons BT3 are each titled "Page 1", "Page 2" and "Page 3". By selecting one of them, a display content is changed-over. The terminate button BT4 is titled "Close". By selecting this, the console panel CP0 is closed. In addition, various kinds of effect buttons BT5 and control buttons BT6 are horizontally arranged and displayed in GUI mode in the central section and the lower section of the console panel CP0, respectively.

At the step where the console panel CP0 is displayed, the personal computer 12 is merely connected to the video camera 11 through the communication cable 13. In this state, a command (hereinafter referred to as status command) for representing a status of the personal computer 12 is transmitted to the video camera 11 as an unknown communication target. Responding to the status command, the video camera 11 returns a command (hereinafter referred to as status response) for representing a status of the video camera 11 to the personal computer 12.

The status response in this state recognizes that the video camera 11 is insufficiently prepared for the DVD creation operation, for example, a videotape has not been inserted, or the controlled state monitoring program which is resident in the communication target, that is, the personal computer 12 has not been set.

Accordingly, in the console panel CP0, an effect button titled "Create DVD" of a plurality of the effect buttons arranged in the middle section is disabled and the video camera 11 recognizes that the video camera 11 is insufficiently prepared for the DVD creation operation, for example, a videotape has not been inserted, or the controlled state monitoring program which is resident in the communication target, that is, the personal computer 12 has not been set.

After starting-up the control status monitoring program, the personal computer 12 recognizes the communication target, that is, video camera 11 as the model compatible with "Set It And Leave It" feature for DVD creation, and outputs a corresponding status command while making the DVD creation application ready to start-up. Corresponding to the status command, video camera 11 switches the console panel CP0 to the console panel CP1 to make the effect button titled "Create DVD" able to select.

When the effect button titled "Create DVD" is selected on the console panel CP1, the screen switches to a transit picture PT1 included in the upper frame UF1 representing a state of waiting for start-up of the DVD creation application. A message "Create DVD" is displayed on the middle section of the transit picture PT1, and at the same time, an affirmative action button and negative action button are displayed in GUI mode on the lower left side, and lower right side, respectively.

At the state where the transit picture PT1 is being displayed, the control section 19 recognizes that the video camera 11 is insufficiently prepared for the DVD creation, for example, a videotape has not been inserted or the communication target, that is, the personal computer 12 is not ready for the DVD creation. In this state, the affirmative and negative action buttons are disabled so as not to generate a trigger for DVD creation.

After having being prepared for the DVD creation, and making the DVD creation application ready to start-up, the personal computer 12 outputs a corresponding status command. Responding to the status command, the video camera 11 switches the current picture to a transition picture PT2 included in the same upper frame UF1. In the transition picture PT2, the video camera 11 recognizes that the button for starting the DVD creation provided in the operation section 18 has been made able to select.

When a videotape has not been inserted, the current transition picture PT2 switches to a transition picture PT3. On the other hand, when the state of waiting for start-up of the DVD creation application continues by other reasons, the current picture switches to a transition picture PT4.

When the video camera 11 becomes ready for start of the DVD creation application on the personal computer 12 side, the current transit picture switches to a transit picture PT5 included in an upper frame UF2 representing a DVD creation preparation waiting state.

When a disk is not inserted into the imaging data recording section 22, or inserted disk is not blank or not rewritable, it may become impossible to continue the operation. In this case, the personal computer 12 outputs a status command to prompt insertion or change of the disk. Responding to the status command, the video camera 11 switches the current transition picture to a corresponding one of the transition pictures PT6 or PT7, as shown in FIG. 8. The transition pictures PT6, PT7 are included in the upper frame UF3 that represents a state of the disk insertion.

In addition to the transition pictures PT6 and PT7, an upper frame UF4 that represents a state of confirming an overwriting operation is set inside the upper frame UF3 that represents a state of the disk insertion. The upper frame UF4 includes transition pictures PT8, PT9 and PT10.

Rewritable disk has been inserted into the personal computer 12, and the computer 12 outputs a status command for asking the user's confirmation to delete the recorded data. Responding to the status command, the video camera 11 switches the current transition picture to the transition picture PT8 included in the upper frame UF4 that represents a state of confirming the overwriting operation.

In the transition picture PT8, a message confirming whether or not to initialize and overwrite the rewritable disk is displayed. In the next step, the transition picture PT8 switches, depending on a user's selection, to a transition picture PT9 that represents a request for executing the overwriting operation, or a transition picture PT10 that represents a standby state, where the overwriting operation is no longer executed.

The personal computer 12 outputs a status command representing that the imaging data D1 transmitted from the video camera 11 through the communication cable 13 is being captured into an incorporated hard disk drive. Responding to the status command, the video camera 11 switches the current transition picture PT9 that represents a request for executing the overwriting operation to a transition picture PT11 included in an upper frame UF5 that represents the progress of the data copy operation. A message for preventing the user from unplugging the communication cable 13 is displayed in the transition picture PT11.

After capturing the imaging data D1 on the hard disk drive, the personal computer 12 enters into a state of preparation for recording the imaging data D1 on the DVD, and outputs a status command representing that the data is being subjected to authoring process. Responding to the status command, the video camera 11 switches the transition picture PT11 to a transition picture PT12.

Further, after capturing the imaging data D1 on the hard disk drive, the personal computer 12 outputs a status command representing that the authorized imaging data D1 is being recoded on the DVD. Responding to the status command, the video camera 11 switches the transition picture PT12 to a transition picture PT13. Note that when a finalizing process is in progress, a corresponding message is displayed in the transition picture PT13.

Figure 9:
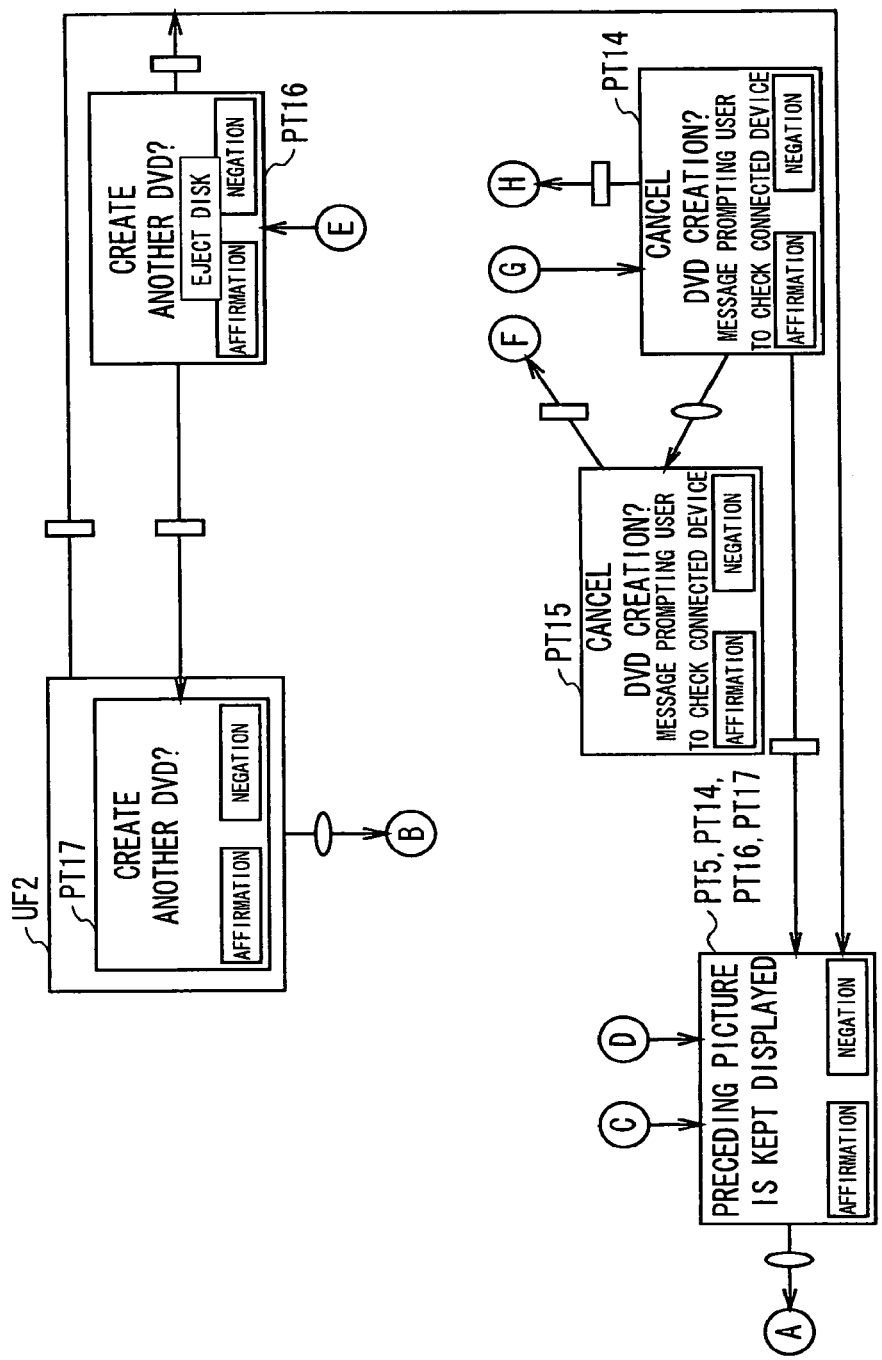
FIG. 9 is a schematic diagram to help explain the normal state transition diagram.

If some kind of error that relates to the DVD creation operation and requires a restoration operation has occurred in the personal computer 12 when the data copy operation is underway, the personal computer 12 outputs a status command for prompting the user to check the connected device. Responding to the status command, in the video camera 11, as shown in FIG. 9, a transition is made from any of the transition pictures PT11 to PT13 included in the upper frame UF5 that represents the progress of the data copy operation to a transition picture PT14 before finalization or a transition picture PT15 after finalization. A message that asks the user to cancel the DVD creation and one that prompts the user to check the connected device are displayed respectively in the transition pictures PT14 and PT15.

When the DVD creation has been completed, the personal computer 12 outputs a status command that represents a state of inquiring whether another DVD will be created. Responding to the status command, the video camera 11 switches the current transition picture PT13 included in the upper frame UF5 that represents the progress of the data copy operation to a transition picture PT16. A message for prompting the user to eject the disk is displayed in the transition picture PT16.

When the user selects to create another DVD on the video camera 11, the transition picture PT16 switches to a transition picture PT17 included in the above-mentioned upper frame UF2 that represents the DVD creation preparation waiting state.

When the user wants to exit the DVD creation application for reasons of the video camera 11 (termination based on a normal operation) at a time when one of the pictures including the transition pictures PT5 and PT17 that are included in the upper frame UF2, the transition picture PT16, and the transition picture PT14 is being displayed, the current picture can be switched to the console panel CP0 (FIG. 7).

(2-3-2) State Transition Diagram ST2 Including Exception/Suspension Process

Figure 8:
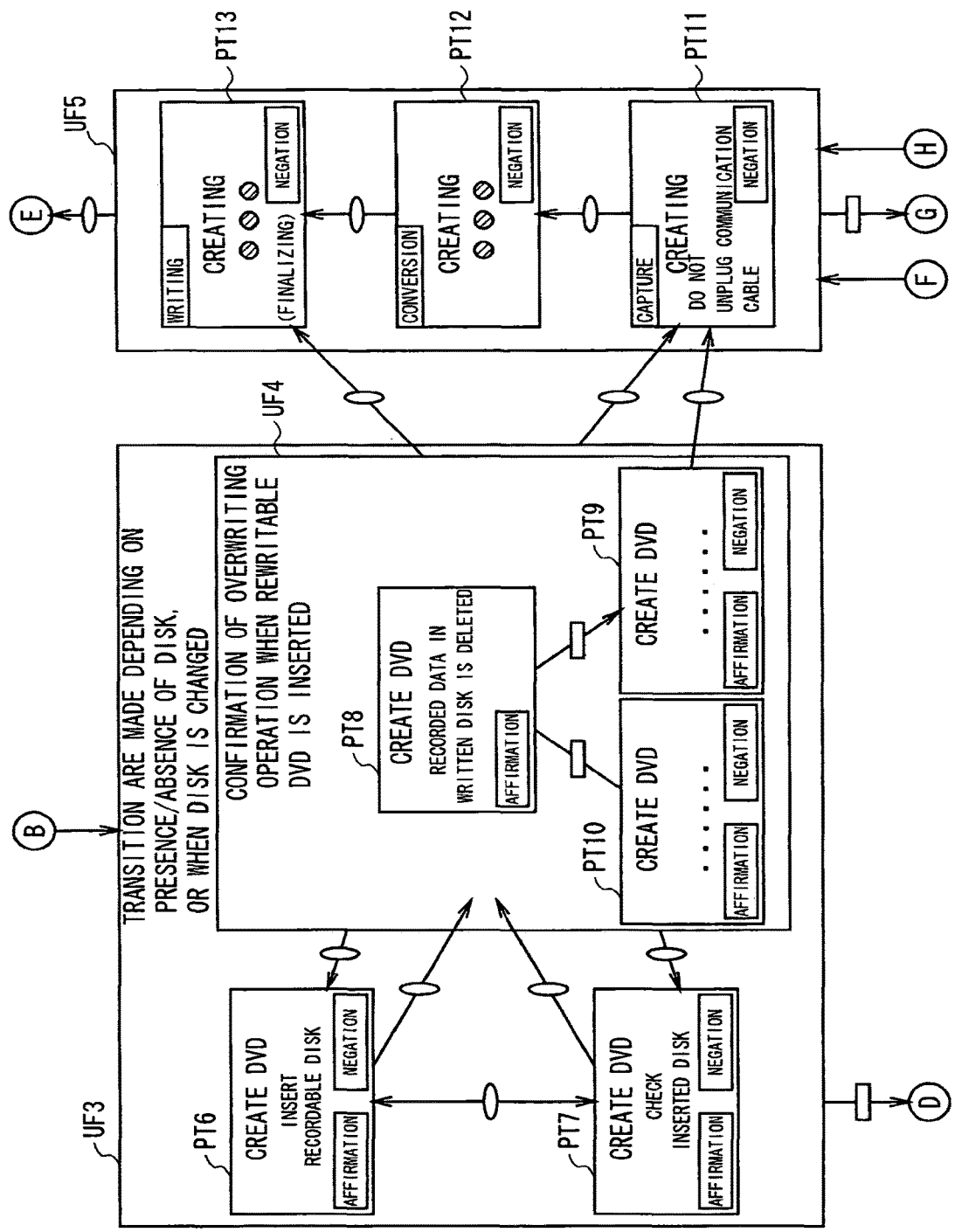
FIG. 8 is a schematic diagram to help explain the normal state transition diagram.
Figure 10:
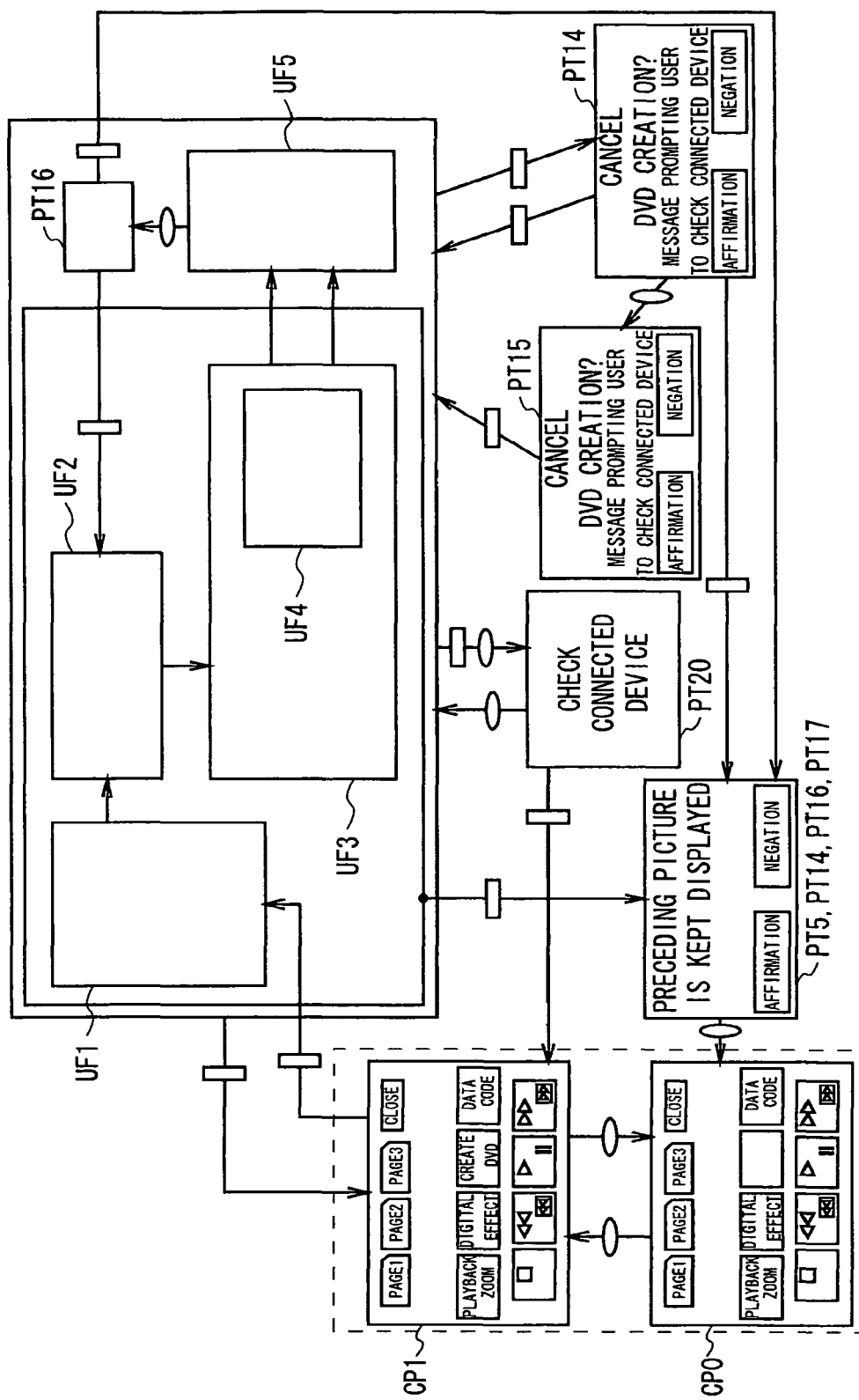
FIG. 10 is a schematic diagram to help explain the state transition diagram including exception/suspension process.

The state transition diagram ST2 shown in FIG. 10 in which the same parts as those in FIGS. 7 to 9 are indicated by the same reference numerals is the same as the above state transition diagram ST1 (FIGS. 7 to 9) except that a transition picture PT20 is added.

More specifically, when some kind of error that requires restoration operation on the operation section 23 side has occurred, the personal computer 12 outputs a corresponding status command. Responding to the status command, disconnection of the communication cable 13, communication timeout or the like, the video camera 11 recognizes that a untreatable error has occurred and switches the current transition picture included in any of the upper frames UF1 to UF5 to the transition picture PT20, which prompts the user to check the connected device with a message "Check connected device" displayed.

(3) Operations and Effects of Present Embodiment

As described above, in the video camera system 10, with the controlled state monitoring programs previously set for recognizing a controlled state of each other in the video camera 11 and personal computer 12 respectively, they are connected with each other through the communication cable 13 conforming to IEEE 1394 standard. Under this configuration, a series of processes for the DVD creation application are executed from start-up to end thereof on the personal computer 12 side, based on the user's operation performed only on the video camera 11 side.

Therefore, it is sufficient for the user to operate only the video camera 11 in order to copy the imaging result, that is, imaging data D1 output from the video camera 11 to the DVD inserted into the personal computer 12. In other words, the screen display section 24 of the personal computer 12 need not be turned on.

On the video camera 11, the process of the DVD creation application is allowed to be displayed, which prevents erroneous operations of the user, such as unplugging of the communication cable in the case where the user operates only the video camera 11.

According to the above configuration, in the video camera system 10, a series of processes for the DVD creation application are executed from start-up to end thereof on the personal computer 12 side based on the user's operation performed only on the video camera 11 side, with the video camera 11 connected to the personal computer 12 through the communication cable 13, thereby carrying out the data copy operation of the imaging data D1 transmitted from the video camera 11 using the personal computer 12 without turning on the screen display section 24 of the personal computer 12. Thus, the video system 10 capable of dramatically improving the usability thereof can be realized.

(4) Another Embodiments

In the above embodiment, the configuration as shown in FIG. 3 is applied as the video camera system (recording control system) 10 in which the video camera (imaging device) 11 configured to output the imaging data D1 obtained as imaging result of the object communicates with the personal computer (recording device) through the communication cable (communication means) 13 conforming to IEEE 1394 standard (predetermined transmission method). The present invention is not limited to this, but can widely be applied to other recording control systems including various kinds of imaging devices and recording devices.

In the above embodiment, the video camera 11 as shown in FIG. 3 having the control section (control means, first control means) 19 for recognizing a controlled state of the personal computer (recording device) 12, the operation section (input means) 18 for allowing the personal computer (recording device) 12 to execute the DVD creation application needed for a recording operation obtained by controlling the personal computer (recording device) 12 is applied as the imaging device according to the present invention. The present invention is not limited to this, but can widely be applied to other various kinds of configurations such as an imaging device as a mobile device including, for example, a mobile phone and personal digital assistance (PDA).

In the above embodiment, the video camera (imaging device) 11 shown in FIG. 3 allows the screen display section (display means) 17 to display the progress of the DVD creation application needed for a recording operation obtained by controlling the personal computer (recording device) 12. The present invention is not limited to this, but can widely be applied to other various kinds of display means as far as, by presenting the user with processes of the DVD creation application, they can prevent erroneous operations of the user, such as unplugging of the communication cable in the case where the user operates only the video camera 11.

In the above embodiment, the personal computer 12 as shown in FIG. 3 having the control section (second control means) 25 for recognizing a controlled status of the video camera (imaging device) 11, and imaging data recording section (recording means) 22 for recoding the imaging data D1 obtained from the video camera (imaging device) 11 through the communication cable (communication means) 13 based on the execution of the DVD creation application obtained by controlling the personal computer (recording device) 12 through the operation section (input means) 18, is applied as the recording device according to the present invention. The present invention is not limited to this, but can be applied to the personal computer 12 that an external hard disk drive is connected to, in the case where the personal computer 12 itself does not have a recording means. Further, the present invention can be also applied to optical disk recording apparatus such as a DVD recorder.

In the above embodiment, the system providing a one-to-one connection shown in FIG. 3 is applied as the video camera system (recording control system) 10 in which the video camera (imaging device) 11 which outputs the imaging data D1 obtained as the imaging result of the object communicates with the personal computer (recording device) through the communication cable (communication means) 13 conforming to IEEE 1394 standard (predetermined transmission method). However, the present invention is not limited to this. A plurality of recording devices may be connected to a single imaging device, or a single recording device may be connected to a plurality of imaging devices.

Figure 11:
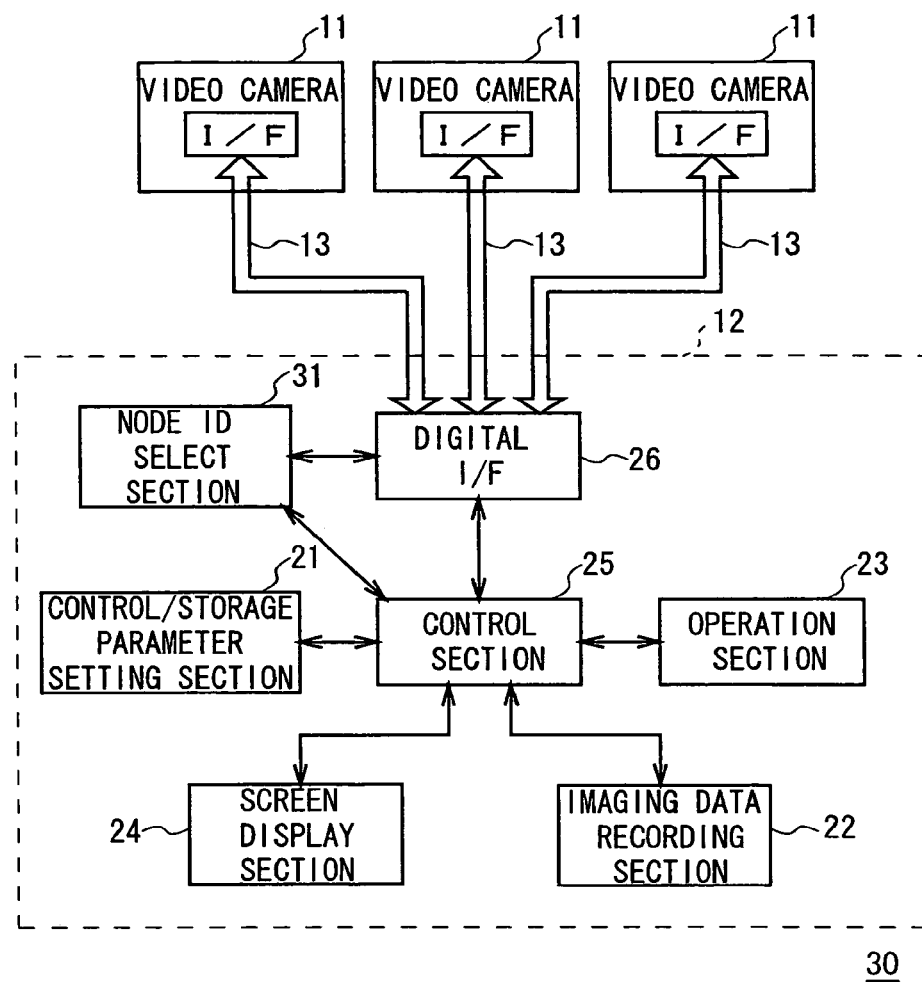
FIG. 11 is a block diagram showing a configuration of the video camera system according to another embodiment.

For example, in the video camera system 30 shown in FIG. 11 in which the same parts as those in FIG. 3 are indicated by the same reference numerals, the single personal computer 12 is connected to a plurality of the video cameras 11. In this configuration, a node ID select section 31 is added to the personal computer 12, and each video camera 11 is connected to the digital interface 26 through the communication cable 13.

Since the communication cable 13 conforms to IEEE 1394 standard, unique node IDs respectively assigned to devices that are connected to each other through the communication cable 13 can be used to select the target device to/from which the personal computer 12 sends and receives commands or responses from a plurality of the video cameras 11. In practice, the node ID select section 31 of the personal computer 12 selects the previously stored node ID corresponding to the specified video camera 11 to allow the digital interface 26 not to send/receive the commands or responses issued based on the controlled state monitoring program to and from the video cameras 11 that correspond to other node IDs than the selected node ID.

As described above, in the video camera system 30, the imaging data D1 output only from the video camera 11 that the user selects from a plurality of video cameras 11 can be used as the target data of the data copy operation executed on the personal computer 12. While the node ID select section 31 and control section 25 are independently provided here, the process of the node ID select section 31 may be executed by the control section 25.

Figure 1:
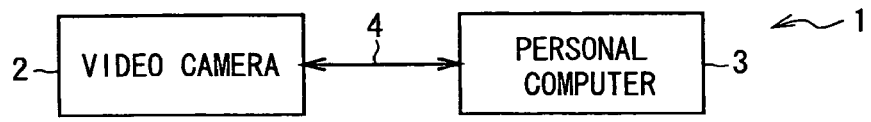
FIG. 1 is a block diagram showing a configuration of the video camera system according to the conventional embodiment.
Figure 12:
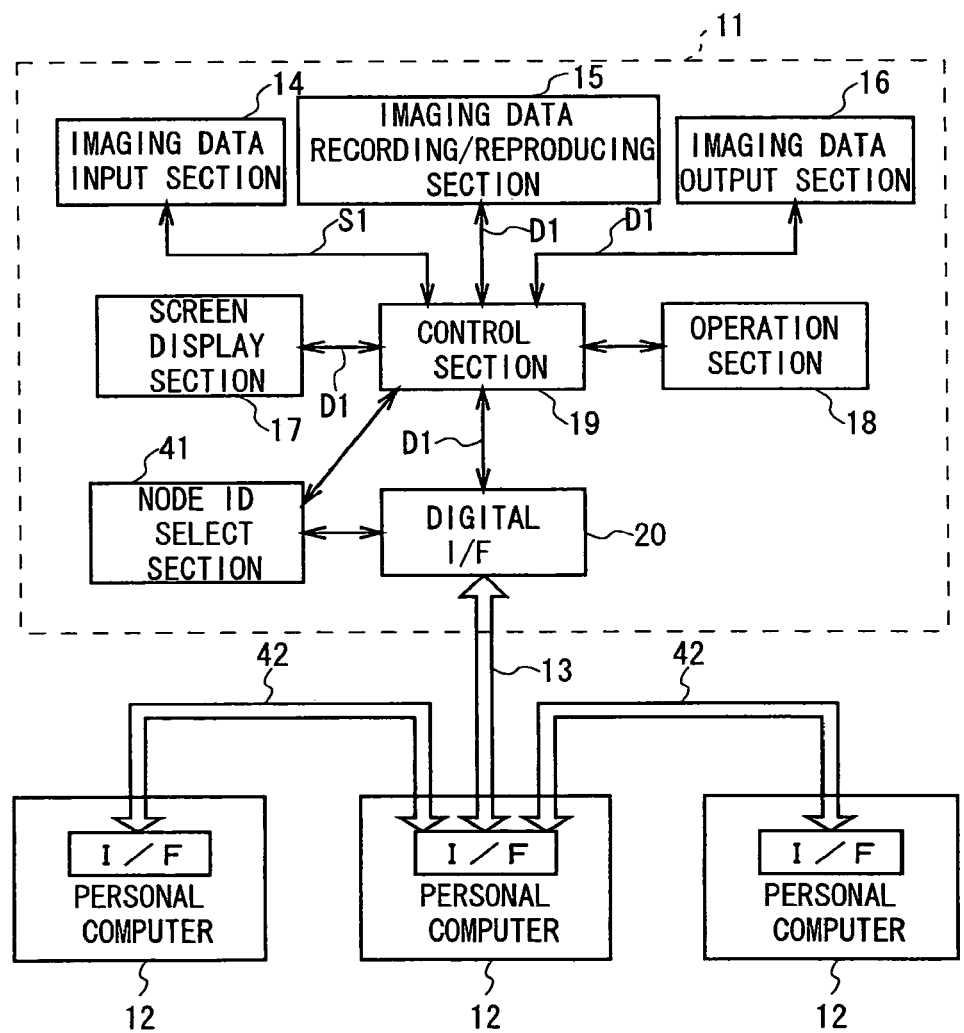
FIG. 12 is a block diagram showing a configuration of the video camera system according to another embodiment.
Figure 2:
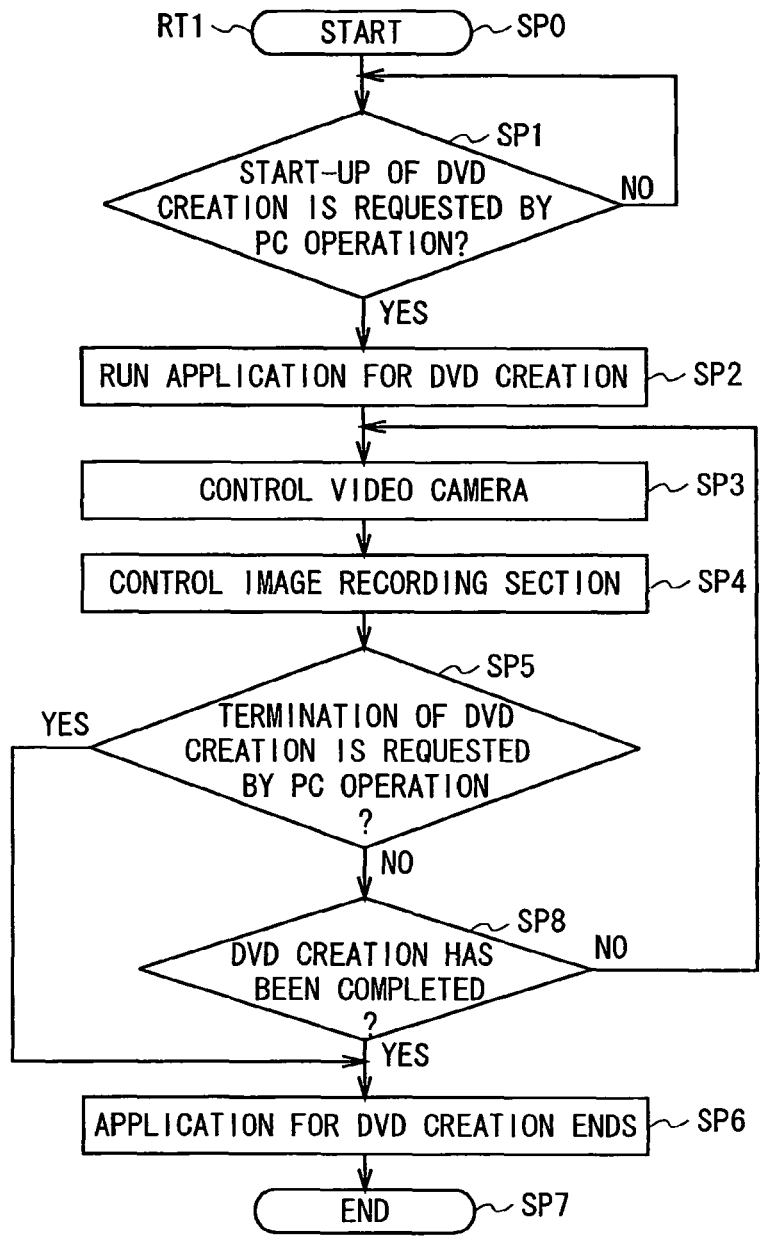
FIG. 2 is a flowchart to help explain the conventional image copying routine.

For example, in the video camera system 40 shown in FIG. 12 in which the same parts as those in FIG. 3 are indicated by the same reference numerals, a plurality of the personal computers 12 are connected to the single video camera 11. In this configuration, a node ID select section 41 is added to the video camera 11, and the personal computers 12 other than the personal computers 12 connected to the video camera 11 through the communication cable 13 are connected to each other through the communication cable 42.

Since the communication cables 13 and 42 conform to IEEE 1394 standard, unique node IDs respectively assigned to devices that are connected to each other through the communication cable 13 and 42 can be used to select the target device to/from which the video camera 11 sends and receives commands or responses from a plurality of the personal computers 12. In practice, the node ID select section 41 of the video camera 11 selects the previously stored node ID corresponding to the specified personal computer 12 to allow the digital interface 20 not to send/ receive the commands or responses issued based on the controlled state monitoring program to and from the personal computers 12 that correspond to other node IDs than the selected node ID.

As described above, in the video camera system 30, only the personal computer 12 that the user selects from a plurality of personal computers 12 can be served as the recording device to the user. While the node ID select section 41 and the control section 19 are independently provided here, the process of the node ID select section 41 may be executed by the control section 19.

Further, in the above embodiment, the communication cable 13 which conforms to IEEE 1394 standard is applied as a communication means according to predetermined transmission method. The present invention is not limited to this, but can widely be applied to communication means constituted by not only wired communication networks but also by wireless communication networks including, for example, a wireless LAN such as Bluetooth technology, as far as they can exchange various pieces of data with the corresponding devices. The communication means need not be provided in the imaging device, and may be connected to the outside of the imaging device as a cradle.

Further, while settings relating to a capture start point, bit rate at the time of recording data on the DVD, and the like in the "Set It And Leave It" feature for DVD creation RT2 on the video camera 11 side shown in FIG. 4 have not been described in the above embodiment, they may be set by default values of the DVD creation application. When the settings need to be changed on the video camera 11, the personal computer 12 must be notified of setting menu items arranged on the video camera 11 side by communication at the start of the DVD creation application. Further, when some kind of problem has occurred on the personal computer 12 to stop the progress of the application, the video camera 11 may be notified of a cause of the problem to ask for user's response.

Furthermore, in the above embodiment, the personal computer 12 executes the DVD creation application according to the operation from the video camera 11. The present invention is not limited to this, and when the personal computer 12 has a limited data communication resource, other application may be inhibited from using the communication resource while the communication resource is used by a specified application.

As described above, according to the present invention, an imaging device configured to output imaging data that is obtained by imaging of an object comprises a control means for recognizing a controlled state of an external recording device when a communication is enabled with the recording device through a communication means conforming to a predetermined transmission method and an input means for allowing the recording device to execute an application needed for a recording operation obtained by controlling the recording device. The recording device is configured to record the imaging data obtained through the communication means when the application is executed by means of the input means. This configuration enable the user to allow the recording device to execute the application required for the recording operation using only the input means of the imaging device, thereby copying the imaging result of the imaging device to the recording device. Thus, the imaging device capable of dramatically improving the usability thereof can be realized.

Further, according to the present invention, in a recording control system in which an imaging device configured to output imaging data that is obtained by imaging of an object can communicate with a recording device through a communication means conforming to a predetermined transmission method, the imaging device comprises a first control means for recognizing a controlled state of the recording device and an input means for allowing the recording device to execute an application needed for a recording operation obtained by controlling the recording device. The recording device comprises a second control means for recognizing a controlled state of the imaging device and a recording means for recording the imaging data obtained from the imaging device through the communication means when the application is executed by means of the input means. This configuration enable the user to allow the recording device to execute the application required for the recording operation using only the input means of the imaging device, thereby copying the imaging result of the imaging device to the recording device. Thus, the recording control system capable of dramatically improving the usability thereof can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

The invention claimed is:

1. An image processing apparatus comprising:
circuitry configured to:
receive imaging data from an imaging device, in which the imaging device is controlled by the image processing apparatus to transmit the imaging data;
transmit a start-up request to an external apparatus, the start-up request configured to launch a previously installed application including an image processing function;
receive control state data from the external apparatus, the control state data being transmitted by the external apparatus to the image processing apparatus in response to the external apparatus receiving the start-up request and indicating a status of the previously installed application; and
transmit the imaging data to the external apparatus, in response to activation of the previously installed application,
wherein the previously installed application is activated automatically in response to the start-up request for the launching of the application, and
wherein the external apparatus is configured to process the imaging data based on the image processing function executed.

2. The image processing apparatus according to claim 1, further comprising a display unit configured to display progress of the image processing function based on the control state data received from the external apparatus.

3. The image processing apparatus according to claim 1, wherein the circuitry is configured to switch display on the display unit from a first screen to a second screen to indicate the progress of the image processing function.

4. The image processing apparatus according to claim 1, wherein the start-up request for the launching of the application is communicated by a first communication and the imaging data is transmitted by a second communication.

5. The image processing apparatus according to claim 4, wherein each of the first communication and the second communication is a wireless communication.

6. The image processing apparatus according to claim 4, wherein the first communication is of a first communication type and the second communication is of a second communication type, the first communication type being different from the second communication type.

7. The image processing apparatus according to claim 6, wherein each of the first communication type and the second communication type is wireless communication.

8. The image processing apparatus according to claim 1, wherein the circuitry is configured to recognize a controlled state of the external apparatus when a communication is enabled with the external apparatus.

9. The image processing apparatus according to claim 8, wherein the communication is performed outside of the image processing apparatus.

10. The image processing apparatus according to claim 1, wherein the imaging device includes an imaging data recording and reproducing device.

11. The image processing apparatus according to claim 1, wherein the imaging device includes a display.

12. The image processing apparatus according to claim 1, further comprising:
  a digital interface.

13. The image processing apparatus according to claim 1, further comprising:
  a display.

14. The image processing apparatus according to claim 13,
  wherein the circuitry is configured to control display of a control button on the display.

15. The image processing apparatus according to claim 13,
  wherein the circuitry is configured to control display of a menu item on the display.

16. The image processing apparatus according to claim 1, wherein the external apparatus is a personal computer having communication capability.

17. The image processing apparatus according to claim 1, wherein the external apparatus includes a disk drive.

18. The image processing apparatus according to claim 1, wherein the external apparatus includes a digital interface.

19. An image processing method for an image processing apparatus, the method comprising:
  receiving imaging data from an imaging device, in which the imaging device is controlled by the image processing apparatus to transmit the imaging data;
  transmitting a start-up request to an external apparatus, the start-up request configured to launch a previously installed application including an image processing function;
  receiving control state data from the external apparatus, the control state data being transmitted by the external apparatus to the image processing apparatus in response to the external apparatus receiving the start-up request and indicating a status of the previously installed application; and
  transmitting the imaging data to the external apparatus, in response to activation of the previously installed application,
  wherein the previously installed application is activated automatically in response to the start-up request for the launching of the application, and
  wherein the external apparatus is configured to process the imaging data based on the image processing function executed.

20. An image processing apparatus comprising:
  circuitry configured to:
    receive imaging data from an imaging device;
    transmit a start-up request to an external apparatus, the start-up request configured to launch a previously installed application including an image processing function;
    receive control state data from the external apparatus, the control state data being transmitted by the external apparatus to the image processing apparatus in response to the external apparatus receiving the start-up request and indicating a status of the previously installed application; and
    control the imaging device to transmit the imaging data to the external apparatus, in response to activation of the previously installed application,
  wherein the previously installed application is activated automatically in response to the start-up request for the launching of the application, and
  wherein the external apparatus is configured to process the imaging data based on the image processing function executed.

* * * * *